United States Patent
Seo et al.

(10) Patent No.: US 12,278,359 B2
(45) Date of Patent: Apr. 15, 2025

(54) ELECTRODE ASSEMBLY COMPRISING ANODE SHEET AND ANODE HAVING IMPROVED STACKING CHARACTERISTICS OF ELECTRODE, AND METHOD OF MANUFACTURING THE SAME

(71) Applicant: LG Energy Solution, Ltd., Seoul (KR)

(72) Inventors: Tai Joon Seo, Daejeon (KR); Dong Hee Sul, Daejeon (KR); Dong Hun Song, Deajeon (KR); Woo Yong Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/914,573

(22) PCT Filed: Dec. 18, 2020

(86) PCT No.: PCT/KR2020/018686
§ 371 (c)(1),
(2) Date: Sep. 26, 2022

(87) PCT Pub. No.: WO2022/034995
PCT Pub. Date: Feb. 17, 2022

(65) Prior Publication Data
US 2023/0223509 A1    Jul. 13, 2023

(30) Foreign Application Priority Data

Aug. 14, 2020  (KR) .................. 10-2020-0102132
Dec. 15, 2020  (KR) .................. 10-2020-0175841

(51) Int. Cl.
*H01M 4/04*    (2006.01)
*G01B 7/06*    (2006.01)
(Continued)

(52) U.S. Cl.
CPC .......... *H01M 4/0409* (2013.01); *G01B 7/087* (2013.01); *H01M 4/364* (2013.01); *H01M 10/0583* (2013.01); *H01M 10/0587* (2013.01)

(58) Field of Classification Search
CPC ................................................ H01M 10/0583
See application file for complete search history.

(56) References Cited

U.S. PATENT DOCUMENTS

2014/0141326 A1    5/2014  Kwon et al.
2014/0193710 A1    7/2014  Hasegawa
(Continued)

FOREIGN PATENT DOCUMENTS

CN    216054795 U    3/2022
DE    102011083830 A1    4/2013
(Continued)

OTHER PUBLICATIONS

International Search Report for Application No. PCT/KR2020/018686 mailed May 7, 2021, pp. 1-3.
(Continued)

*Primary Examiner* — Stephan J Essex
(74) *Attorney, Agent, or Firm* — Lerner David LLP

(57) ABSTRACT

An electrode assembly is manufactured by a process. The electrode assembly comprises an anode sheet and an anode having improved stacking characteristics of an electrode based on a shoulder portion. The shoulder portion is solid. The shoulder portion is thicker than a conventional electrode tab and has no light reflection with the application of an active material when the electrode assembly is formed, including during notching, cutting of a single electrode, and stacking.

4 Claims, 13 Drawing Sheets

(51) Int. Cl.
    *H01M 4/36*         (2006.01)
    *H01M 10/0583*    (2010.01)
    *H01M 10/0587*    (2010.01)

(56) References Cited

U.S. PATENT DOCUMENTS

| | | |
|---|---|---|
| 2015/0086864 A1 | 3/2015 | Park et al. |
| 2016/0126516 A1 | 5/2016 | Komiya |
| 2017/0062867 A1 | 3/2017 | Kim et al. |
| 2023/0223509 A1 | 7/2023 | Seo et al. |

FOREIGN PATENT DOCUMENTS

| | | | | |
|---|---|---|---|---|
| EP | 2871700 | A1 | 5/2015 | |
| JP | H08-64479 | A | 3/1996 | |
| JP | 2001035477 | A | 2/2001 | |
| JP | 2003068278 | A | 3/2003 | |
| JP | 2009123752 | A | 6/2009 | |
| JP | 2010086813 | A | 4/2010 | |
| JP | 2013218819 | A | 10/2013 | |
| JP | 2015528639 | A | 9/2015 | |
| JP | 2015536034 | A | 12/2015 | |
| JP | 2018092713 | A | 6/2018 | |
| JP | 2019050095 | A | 3/2019 | |
| JP | 2019212461 | A | 12/2019 | |
| KR | 20150033993 | A | 4/2015 | |
| KR | 20150089803 | A | 8/2015 | |
| KR | 101569798 | B1 | 11/2015 | |
| KR | 20170026769 | A | 3/2017 | |
| KR | 2017045515 | A * | 4/2017 | ........ H01M 10/0413 |
| KR | 20170055722 | A | 5/2017 | |
| KR | 101810025 | B1 | 12/2017 | |
| KR | 20180097243 | A | 8/2018 | |
| KR | 20190086942 | A | 7/2019 | |
| KR | 102065369 | B1 | 1/2020 | |
| KR | 20200043677 | A | 4/2020 | |
| KR | 20200074613 | A | 6/2020 | |
| WO | 2013031891 | A1 | 3/2013 | |

OTHER PUBLICATIONS

Partial Supplementary European Search Report including Written Opinion for Application No. 20949624.9 dated Jul. 5, 2024, pp. 1-15.

Extended European Search Report including Written Opinion for Application No. 20949624.9 dated Aug. 28, 2024, pp. 1-13.

* cited by examiner

PRIOR ART

ELECTRODE ASSEMBLY COMPRISING ANODE SHEET AND ANODE HAVING IMPROVED STACKING CHARACTERISTICS OF ELECTRODE, AND METHOD OF MANUFACTURING THE SAME

CROSS-REFERENCE TO RELATED APPLICATIONS

This application is a national phase entry under 35 U.S.C. § 371 of International Application No. PCT/KR2020/018686 filed on Dec. 18, 2020, which claims priority from Korean Patent Application No. 2020-0102132 filed on Aug. 14, 2020, and Korean Patent Application No. 2020-0175841 filed on Dec. 15, 2020, the disclosures of which are incorporated herein by reference in their entireties.

FIELD

The present invention relates to an electrode assembly comprising an anode sheet and an anode having improved stacking characteristics of an electrode, and a method of manufacturing the same, and more particularly to an electrode assembly comprising an anode sheet and an anode having improved stacking characteristics of an electrode based on a shoulder portion, in which the shoulder portion is solid, as the shoulder portion is thicker than a conventional electrode tab, and has no light reflection with the application of an active material when forming the electrode assembly including notching, cutting of a single electrode and stacking, and a method of manufacturing the same.

BACKGROUND

Recently, secondary batteries, which are capable of being charged and discharged, have been widely used as energy sources for wireless mobile devices. In addition, the secondary batteries have also attracted considerable attention as energy sources for electric vehicles and hybrid electric vehicles, which have been developed to solve problems, such as air pollution, causing by existing gasoline and diesel vehicles using fossil fuels. As a result, kinds of applications using the secondary batteries are being increased owing to advantages of the secondary batteries, and hereafter the secondary batteries are expected to be applied to more applications and products than now.

Based on the configuration of electrodes and an electrolyte, the secondary batteries may be classified as a lithium-ion battery, a lithium-ion polymer battery, or a lithium polymer battery. Thereamong, the lithium-ion polymer battery has been increasingly used because the lithium-ion polymer battery has a low possibility of electrolyte leakage and can be easily manufactured. In general, based on the shape of a battery case, the secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

An electrode assembly, which is mounted in a battery case, is a power generating element that is configured to have a structure including a cathode, an anode, and a separator interposed between the cathode and the anode, and that can be charged and discharged. The electrode assembly is classified as a jelly-roll type electrode assembly, which is configured to have a structure in which a long sheet type cathode and a long sheet type anode, to which active materials are applied, are wound in the state in which a separator is interposed between the cathode and the anode, or a stacked type electrode assembly, which is configured to have a structure in which a plurality of cathodes having a predetermined size and a plurality of anodes having a predetermined size are sequentially stacked in the state in which separators are disposed respectively between the cathodes and the anodes.

FIG. 1 is a schematic view of a manufacturing process of a conventional stacked electrode assembly.

Referring to FIG. 1, a stacked electrode assembly 10 is configured to have a structure such that the electrode assembly 10 includes a cathode plate 1, an anode plate 2, and a second separator stacked between unit cells having a separator 5 interposed between the cathode plate 1 and the anode plate 2, and a cathode tab 3 and an anode tab 4 protruded from the cathode plate 1 and the anode plate 2 are electrically attached to one side of the cathode plate 1 and the anode plate 2. The construction described above also applies to the jelly-roll type electrode assembly.

In the structure of the conventional stacked electrode assembly, it is difficult to increase the capacity of a secondary battery, and thus, there is a disadvantage in that it cannot meet the demand for a high-capacity secondary battery due to the miniaturization or slimness of a device.

Moreover, when an error occurs in manufacturing processes such as a notching process of notching a plurality of electrodes from an electrode sheet having an electrode mixture layer coated on one side or both sides of electrode plates, or an alignment process of electrodes, it not only lowers capacity of the battery but also shortens a lifespan of the battery.

In particular, as shown in a photo of FIG. 1 in which the conventional anode tab is folded, since the electrode tab formed through notching is formed only of metal foil, it may not be suitable as a reference line for subsequent processes due to problems such as folding and light reflection.

In a general notching process or lamination process, cutting or lamination is performed based on the electrode tab. However, since the electrode tab is made only of metal foil, the electrode tab is thinner than a mixture layer on which an electrode active material is applied, resulting in low process efficiency and high defect rate.

Additionally, FIG. 10 is a cross-sectional view of an electrode assembly according to the prior art. Referring to FIG. 10, the electrode assembly constituting a pouch-type battery cell has a structure in which a separator 5 is interposed between a cathode 10 and an anode 20, and a cathode mixture layer 11 and an anode mixture layer 21 including an electrode active material are coated on one or both surfaces of an anode sheet 200 and a cathode sheet 400, which are current collectors.

FIG. 11 is a detail view of an electrode current collector in which an electrode sheet coated with an electrode active material on both sides and a separator are stacked. Referring to FIG. 11, a cathode mixture layer 11 includes an electrode active material applied between cathode sheets, which are current collectors, and the cathode mixture layer 11 is configured to have a cathode flat portion 111 in which the electrode active material is applied with a uniform thickness, and a cathode inclined portion 112 in which the electrode active material is applied having an inclination. Referring to FIG. 11, an anode mixture layer 21 includes an electrode active material applied between anode sheets, which are current collectors, and the anode mixture layer 21 is configured to have an anode flat portion 211 in which the electrode active material is applied with a uniform thickness, and an anode inclined portion 212 in which the electrode active material is applied having an inclination.

When a thickness $t_N$ of the anode mixture layer is formed thicker than a thickness $t_P$ of the cathode mixture layer, the capacity characteristics of the battery are maintained, and the safety of the battery is also improved.

A cathode and an anode may be coated with a cathode active material or an anode active material on a sheet in the form of a metal foil as a current collector. The cathode and the anode may have sliding parts in which a difference in thickness coated at opposite ends of the coated portion occurs due to physical and chemical properties such as viscosity and composition of the active material.

An angle β of the anode inclined portion is smaller than an angle α of the cathode inclined portion. The reason that an inclination of the anode inclined portion is gentler than that of the cathode inclined portion is that the viscosity of the active material of the cathode is higher than that of the anode, and thus, the inclination of the anode inclined portion is relatively gentle. A length $L_N$ of the anode inclined portion in an anode direction is greater than a length $L_P$ of the cathode inclined portion in a cathode direction.

Due to the characteristics of the formation of the mixture layer as described above, there is an anode-to-cathode capacity reversal portion 500 in which an anode-to-cathode capacity ratio (N/P ratio) is reversed. The presence of such an anode-to-cathode capacity reversal portion may cause the lack of space inside the anode 20 into which lithium ions deintercalated from the cathode 10 can be inserted during the repetitive charging and discharging process. As the lithium ions are precipitated as lithium metal on the surface of the anode or metal component impurities incorporated during the battery manufacturing process are recrystallized, safety problems may occur due to an internal short circuit caused by the metal component impurities passing through the separator and contacting the cathode.

FIG. 12 shows experimental results of measuring the anode-to-cathode capacity ratio for each position at which the anode-to-cathode capacity reversal portion occurs. The experiment was conducted with a thin film thickness measuring device (Rotary Caliper, MAYSUN IN JAPAN, RC-1W-1000). In the experiment, after an electrode insertion roller is driven and calibration is completed after washing, an electrode whose thin film thickness is to be measured is inserted between the electrode insertion rollers and the electrode is moved to measure the thickness. A cathode active material-coated portion including the cathode flat portion and the cathode inclined portion and an anode active material-coated portion including the anode flat portion and the anode inclined portion can be observed. The anode-to-cathode capacity reversal portion 500 can be observed in a predetermined portion of the cathode inclined portion and the anode inclined portion.

In terms of suppressing the anode-to-cathode capacity reversal portion as much as possible, a method has been adopted in which a cross-sectional capacity of an anode is larger than a cross-sectional capacity of a cathode at the position at which the anode and the cathode face each other with a separator interposed therebetween. However, with regard to energy density improvement, research has been conducted on the control of the cross-sectional capacity applied or coated on edges of the electrodes, but there are difficulties in controlling the process.

Therefore, there is a need for technology development of an electrode assembly including an anode sheet and an anode, and a method of manufacturing the same, in which the stacking property of an electrode based on a shoulder portion is improved, the shoulder portion being solid as it is thicker than a conventional electrode tab and having no light reflection due to the application of an active material, in order to change the cutting standard of the electrode in the lamination process, improve the alignment accuracy during stacking, and increase the effectiveness of ACOH (Anode Cathode Overhang) gap inspection.

Prior Art Documents

Japanese Patent Application Publication No. 2009-123752
Korean Patent Application Publication No. 2015-0033933
Japanese Patent Application Publication No. 2010-086813

SUMMARY OF THE DISCLOSURE

The present invention has been made to solve the above problems and other technical problems that have yet to be resolved.

In particular, it is an object of the present invention to provide an electrode assembly including an anode sheet and an anode, and a method of manufacturing the same, in which the stacking property of an electrode based on a shoulder portion is improved, the shoulder portion being solid as it is thicker than a conventional electrode tab and having no light reflection due to the application of active material, in order to change the cutting standard of the electrode in the lamination process, improve the alignment accuracy during stacking, and increase the effectiveness of cathode-anode gap inspection.

In accordance with one aspect of the present invention, the above and other objects can be accomplished by the provision of a method of manufacturing an anode to secure an ACOH (Anode Cathode Overhang) gap, the method comprising a first step of manufacturing an anode roll, the anode roll having an active material-coated portion and a non-coated portion formed in a full length direction (Y-axis direction); a second step of performing notching to form an anode tab comprising the active material-coated portion and the non-coated portion, and a shoulder portion comprising the active material-coated portion at a predetermined interval (A) in a full width direction (X-axis direction) of the anode roll; and a third step of cutting at a predetermined interval (B) in a full width direction (X-axis direction) on the basis of the shoulder portion.

Further, a centerline of the shoulder portion in a full length direction may be formed at a level aligned with a cathode tab centerline of a cathode.

Further, a height of the shoulder portion in the full length direction based on an outer peripheral end of an anode may be equal to or lower than a height of the active material-coated portion of the anode tab.

Further, a full width (W6) of the shoulder portion may comprise a full width of the cathode tab and ACOH gaps at both sides of the cathode tab.

Further, a full length (L6) of the shoulder portion may be 0.1 to 3 mm or more from one outer end of the anode.

Further, an R-value of the shoulder portion may be 0.1 to 3 R or more.

In accordance with another aspect of the present invention, there may be provided an anode comprising an anode tab including an active material-coated portion and a non-coated portion, and a shoulder portion including the active material-coated portion at a predetermined interval (A), wherein the shoulder portion is formed at a position facing a cathode tab when stacked with a cathode.

Further, the full width (W6) of the shoulder portion may include a full width of the cathode tab and the ACOH gap, and the full length (L6) of the shoulder portion may include a length of the active material coated portion of the cathode tab and the ACOH gap.

Further, there may be no anode-to-cathode capacity reversal portion in which a section capacity of an anode inclined portion of the active material-coated portion of the shoulder portion is higher than a section capacity of a cathode inclined portion of the active material-coated portion of the cathode tab.

Further, an anode height ratio ($H_{NTN2}/H_{NS}$) of a height ($H_{NTN2}$) from an anode end (215) to an anode tab neck (214) and a height ($H_{NS}$) from a starting point at which the shoulder portion is formed at the anode end to the active material-coated portion is 5.0 to 1.

In accordance with another aspect of the present invention, there may be provided an electrode assembly comprising a cathode in which a cathode tab protrudes from one outer end, and a cathode mixture layer including a cathode active material is applied on a lower portion of the cathode tab and on a current collector; an anode in which an anode tab protrudes from one outer end, and an anode mixture layer including an anode active material is applied on a lower portion of the anode tab and on a current collector; and a separator interposed between the cathode and the anode, wherein the anode comprises an anode tab including the active material-coated portion and the non-coated portion, and a shoulder portion including the active material-coated portion at a predetermined interval (A) in a full width direction (X-axis direction), wherein the shoulder portion is formed at a position facing the cathode tab when stacked with the cathode.

Further, the anode tab and the shoulder portion of the anode may be formed together at one end of the anode in a full length direction (Y-axis direction) or formed at opposite ends of the anode in the full length direction (Y-axis direction).

In accordance with another aspect of the present invention, there may be provided a method of manufacturing an electrode assembly to secure an ACOH (Anode Cathode Overhang) gap, the method comprising vision sensing the shoulder portion of an anode; and stacking such that a cathode tab of a cathode is located on the basis of a full width or a full length of the shoulder portion, wherein an ACOH gap between the stacked cathode tab and the shoulder portion is measured to prevent misalignment of stacking of an electrode assembly, the anode is formed with an anode tab including the active material-coated portion and the non-coated portion, and a shoulder portion including only the active material-coated portion at a predetermined interval (A) along a full width direction (X-axis direction), and a full width of the shoulder portion includes a full width of the cathode tab and ACOH gaps at both sides of the cathode tab.

The method may further comprise stacking such that the cathode tab of the cathode is located on the basis of the full width or the full length of the shoulder portion; and vision sensing the shoulder portion of the anode stacked under the cathode tab of the cathode, wherein an interval between one end of the stacked cathode and one end of the stacked anode in a full length direction (Y-axis direction) and the ACOH gap between the stacked cathode tab and the shoulder portion are measured to define a gap between the cathode and the anode.

Further, the electrode assembly may have a stacked type, a zigzag type, a jelly-roll type, or a stacked/folded type structure.

Further, the electrode assembly may include a single electrode plate and unit cells comprising a bi-cell having the same polarity of electrode plates on both outer surfaces, or full cells having different polarities of electrode plates on both outer surfaces.

Further, the cathode tab and the anode tab may be formed in the same direction or in opposite directions on the basis of the full-length direction (Y-axis direction).

Further, the present invention may provide a battery cell in which the electrode assembly manufactured by the above method is accommodated in a battery case together with an electrolyte.

Further, the present invention may provide a battery pack including one or more of the battery cells.

Further, the present invention may provide a device including the battery pack.

The present invention may provide a method of measuring a thickness of an electrode mixture layer, the method comprising a first step of preparing an electrode sheet comprising an electrode mixture layer;

a second step of inserting the electrode sheet into at least one pair of electrode insertion rollers;

a third step of moving the electrode sheet in one direction while the paired electrode insertion rollers rotate; and a fourth step of obtaining a measured value comprising a thickness ratio of an anode, a thickness ratio of a cathode, and an anode-to-cathode capacity ratio by measuring a thickness of the electrode mixture layer formed on the electrode sheet while the electrode sheet moves, wherein an anode sheet of the electrode sheets is formed with an anode tab including an active material-coated portion and a non-coated portion, and a shoulder portion including the active material-coated portion at a predetermined interval (A).

The device may be selected from a computer, a mobile phone, a wearable electronic device, a power tool, an electric vehicle (EV), a hybrid electric vehicle, an electric two-wheeled vehicle, an electric golf cart, or a power storage system.

The structure and manufacturing method of the device are well known in the art to which the present invention pertains, and a detailed description thereof will be omitted.

As described above, the anode having improved stacking property of an electrode, the electrode assembly comprising the anode, and the method of manufacturing the same according to the present invention have the effect of reducing the occurrence of errors by changing the cutting of an electrode based on a shoulder portion of the anode in the lamination process.

In addition, when stacking to form an electrode assembly, there is an effect of reducing an error due to misalignment when stacking on the basis of the corners of the electrode.

In addition, when stacking to form an electrode assembly, there is an effect of improving the fairness and accuracy of the ACOH gap measurement by measuring the shoulder portion.

In addition, it provides an effect of increasing the capacity of the electrode assembly by efficiently applying the electrode mixture layer including the electrode active material over a larger area without increasing the volume of an electrode plate.

In addition, when forming an electrode assembly, there is an effect of preventing the occurrence of an anode-to-cathode capacity reversal portion, which is caused by a thinner electrode mixture layer including an electrode active material toward the ends of the cathode and the anode.

Therefore, it provides an effect of improving the stability, capacity increase and lifespan of the secondary battery.

DETAILED DESCRIPTION

Hereinafter, the present invention will be described in detail with reference to the accompanying drawings according to an embodiment of the present invention, but this is intended for easier understanding of the present invention and the scope of the present invention is not limited by the description.

ACOH (Anode Cathode Overhang) refers to a gap between a cathode and an anode required for battery stability of the anode and the cathode when constructing a secondary battery.

An electrode tab neck refers to a coated region of an electrode tab formed on an electrode sheet through notching. The electrode tab neck may include an active material-coated inclined portion and a flat portion.

An electrode sheet is a unit electrode notched and cut in an electrode roll.

An electrode assembly refers to a unit cell in which an anode, a separator, and a cathode are stacked.

As used herein, a bidirectional electrode assembly means a medium or large-sized battery such as an electric vehicle, and a unidirectional electrode assembly means an electrode assembly applied to a small battery such as a mobile device.

The electrode assembly may have a stacked type, a zigzag type (see KR 10-1634772 B1), or a stacked/folded type structure.

An electrode roll is a unit body generally obtained by rolling an electrode sheet having a single active material-coated portion and a non-coated portion by slitting a sheet having a plurality of active material-coated portions and a plurality of non-coated portions.

A shoulder portion is configured to be formed on a portion of the anode in which a portion at which a cathode tab of the cathode is formed overlaps when forming the electrode assembly.

The shoulder portion is formed including an active material-coated portion of an anode roll when forming an anode sheet.

When the shoulder portion overlaps the cathode tab through stacking, it has an ACOH in a full width and a full length directions.

Numerical values or reference values presented in the present disclosure are design values, and it is naturally expected that a process error exists when an actual process is applied.

Figure 1:
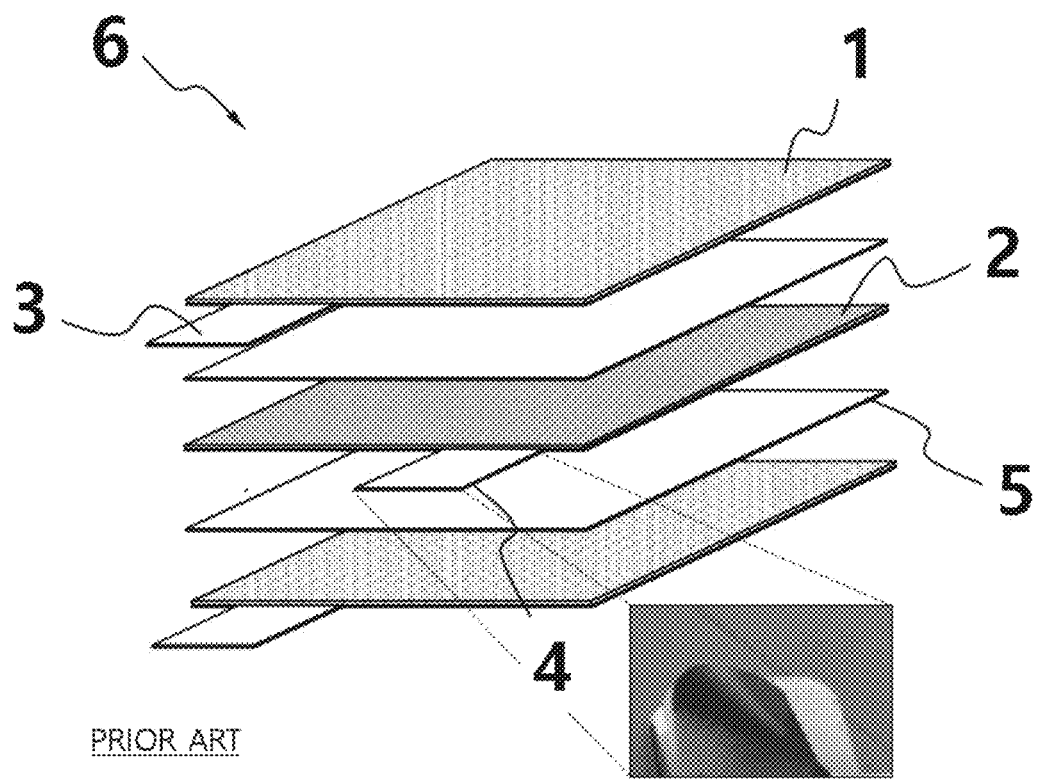
FIG. 1 is a schematic exploded view showing a conventional stacked unidirectional electrode assembly and a folding phenomenon of an electrode tab thereof.

FIG. 1 is a schematic view showing a conventional stacked unidirectional electrode assembly and a folding phenomenon of an electrode tab thereof.

Figure 2:
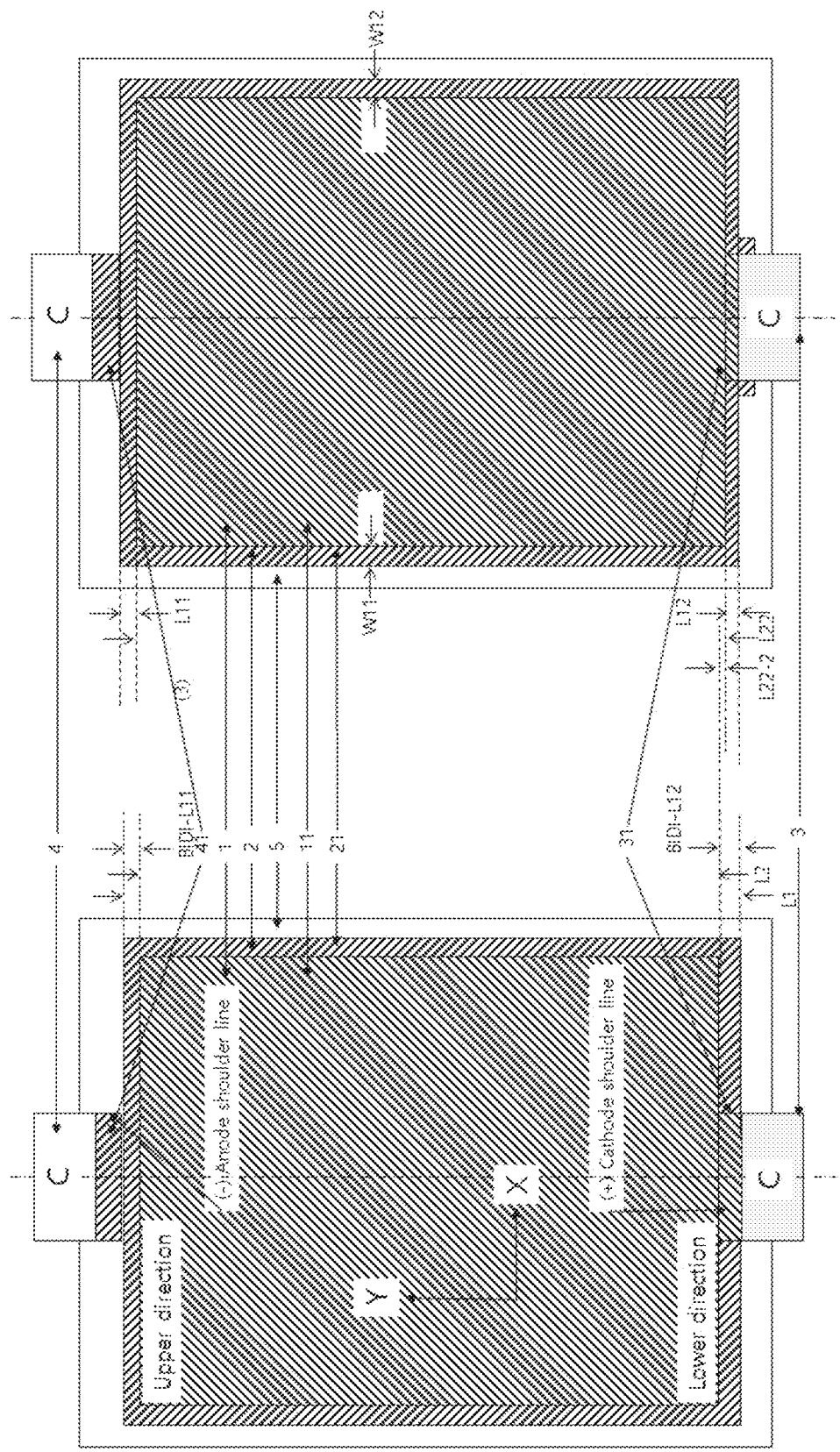
FIG. 2 is a schematic cross-sectional view showing bidirectional electrode plates according to an embodiment as compared to conventional bidirectional electrode plates.

FIG. 2 is a schematic view showing bidirectional electrode plates according to an embodiment as compared to conventional bidirectional electrode plates.

Figure 3:
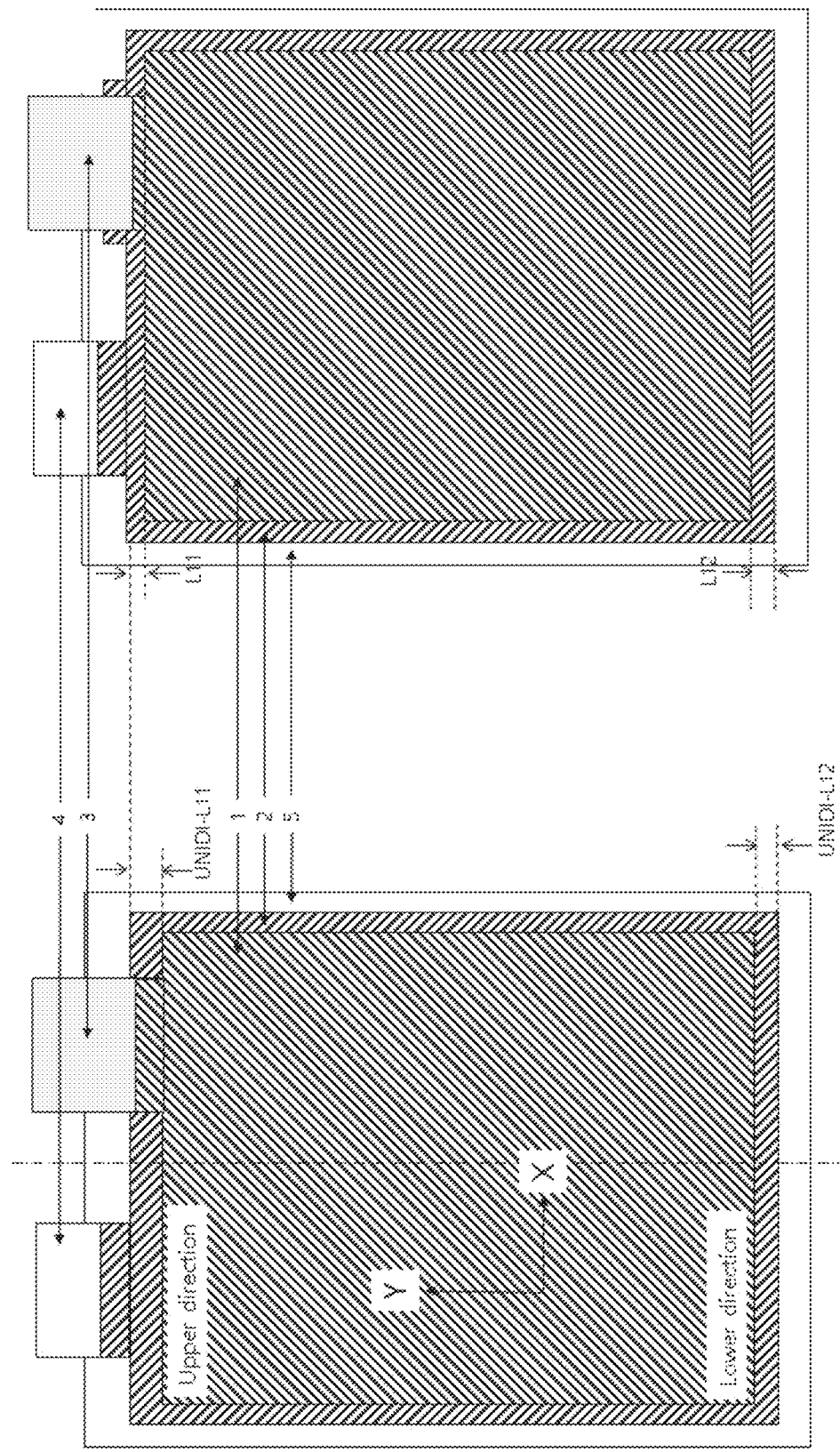
FIG. 3 is a schematic cross-sectional view showing unidirectional electrode plates according to an embodiment as compared to conventional unidirectional electrode plates.

FIG. 3 is a schematic view showing unidirectional electrode plates according to an embodiment as compared to conventional unidirectional electrode plates.

Referring to FIGS. 1 to 3, the electrode assembly is configured to have a structure in which a separator 5 is interposed between a cathode plate 1 and an anode plate 2, the electrode assembly comprising the cathode plate 1, the anode plate 2, and the separator 5.

Figure 4:
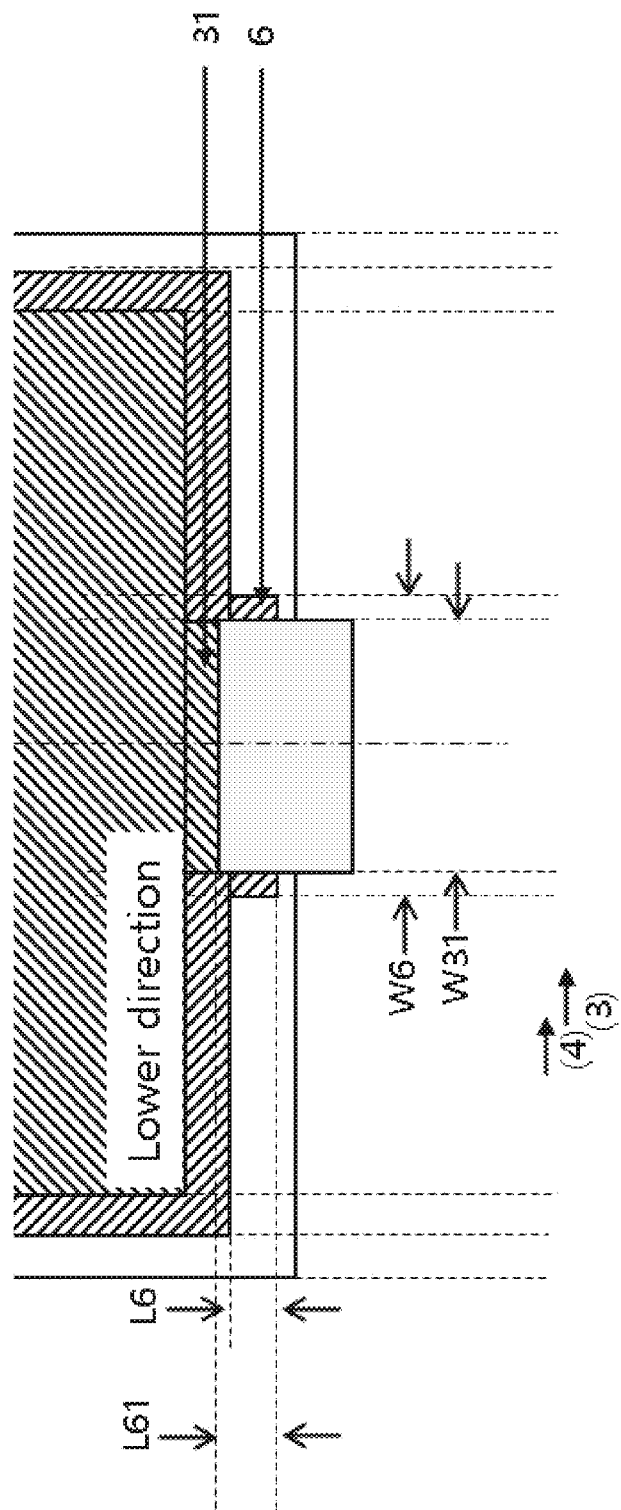
FIG. 4 is a schematic cross-sectional view showing a portion of a cross-section of a bidirectional electrode plate comprising an anode including a shoulder portion according to an embodiment of the present invention.

The configuration of the conventional electrode plates 1 and 2 is disclosed on the left side of FIGS. 2 and 3, and the configuration of the electrode plates according to an embodiment is disclosed on the right side of FIGS. 2 and 3. The electrode plates have a square shape in a plan view, and FIG. 4 shows a partially enlarged view of the electrode plates.

In the cathode plate 1, a cathode tab 3 is protruded from one outer peripheral end in a full length direction (Y-axis direction), and a cathode mixture layer 11 including a cathode active material is applied on a lower portion 31 of the cathode tab protruding from the cathode plate 1 and on a cathode current collector.

In the anode plate 2, an anode tab 4 is protruded from one outer peripheral end in the full length direction (Y-axis direction), and an anode mixture layer 21 including an anode active material is applied on a lower portion 41 of the anode tab protruding from the anode plate 2 and on an anode current collector.

The anode plate 2 has a relatively larger area than the cathode plate 1, and the cathode tab 3 and the anode tab 4 are formed in the same direction (Y-axis direction) so as to have protruding ends of the same length.

A length L1 of the anode plate has a size of the sum of a length L2 of the cathode plate, a length L11 of an upper end of the anode plate, and a length L12 of a lower end of the anode plate, in which the length L11 of the upper end of the anode plate and the length L12 of the lower end of the anode plate are extended longer than the outer peripheral ends of the cathode plate.

The anode plate and the cathode plate are configured to have a structure in which the anode plate and the cathode plate are stacked in a state in which the anode plate and the cathode plate are aligned based on a center line C-C' so as to have the centers of the anode plate and the cathode plate aligned with each other.

The length L11 of the upper end of the anode plate may be extended 0.1 mm or more longer than an upper end of the cathode plate. If it is smaller than the above numerical value, a short circuit may occur due to a process error when forming an electrode assembly through a lamination and stacking process.

The outer peripheral ends of each side of the square shape of the anode plate are extended 0.1 mm longer than the outer peripheral ends of each side of the cathode plate, and a manufacturing process error range is included in this range.

This means that the values of L11, L12, W11 and W12 are 0.1 mm or more. General international standards require a value of 0.1 mm or more. If it is smaller than the above numerical value, a short circuit may occur due to a process error when forming an electrode assembly through a lamination and stacking process.

A length UNIDI-L11, which is extended longer than an upper end of the conventional unidirectional cathode plate from an upper end of the conventional unidirectional anode plate (the direction in which an electrode tab is formed), is greater than a length UNIDI-L12, which is extended longer than a lower end of the conventional unidirectional cathode plate from a lower end of the conventional unidirectional anode plate (the direction in which an electrode tab is not formed). That is, UNIDI-L11>UNIDI-L12.

When comparing the length of the unidirectional cathode plate according to the present invention with the length of the conventional unidirectional cathode plate, the length of the unidirectional cathode plate according to the present invention is longer than the length of the conventional unidirectional cathode plate, resulting in a difference in length, and the effect of increasing capacity due to this difference may be exhibited.

A length BIDI-L12, which is extended longer than an upper end of the conventional bidirectional cathode plate from a lower end of the conventional bidirectional anode plate (the direction in which the anode tab is not formed), is equal to or less than a length BIDI-L11, which is extended longer than a lower end of the conventional bidirectional cathode plate from a lower end of the conventional bidirectional anode plate. It is obvious that the difference in length values is due to a process error occurred during slitting, notching, and cutting through actual process application to the design values.

When comparing a length L22 of the bidirectional cathode plate according to the present invention with a length L2 of the conventional bidirectional cathode plate, the length L22 of the bidirectional cathode plate according to the present invention is longer than the length L2 of the conventional bidirectional cathode plate, resulting in a difference in length L22-2, and the effect of increasing capacity due to this difference may be exhibited.

The length L12 in which the lower end of the bidirectional anode plate according to the present invention is extended longer than the lower end of the bidirectional cathode plate according to the present invention is shorter than the extended length BIDI-L12 of the corresponding conventional bidirectional anode plate. The length L11, which is extended longer than the upper end of the bidirectional cathode plate according to the present invention, is equal to the extended length BIDI-L12 of the corresponding conventional bidirectional anode plate.

FIG. 4 is a schematic view showing a bidirectional electrode plate comprising an anode including a shoulder portion according to an embodiment.

A shoulder portion 6 has a planar rectangular shape, and a protruding length L6 of the shoulder portion 6 is longer than a lower portion 31 of a cathode tab to which a cathode mixture layer 11 is applied.

The shoulder portion 6 is formed on an anode plate facing the cathode tab, and an anode mixture layer is applied to a portion of the anode plate corresponding to the lower portion 31 of the cathode tab to which the cathode mixture layer is applied.

The shoulder portion 6 has a relatively larger area than the lower portion 31 of the cathode tab to which the cathode mixture layer is applied.

Outer peripheral ends of the shoulder portion 6 may have a full length L61 of the shoulder portion and a full width W6 of the shoulder portion, the full length L61 of the shoulder portion and the full width W6 of the shoulder portion being extended 0.1 mm or more from outer peripheral ends of the cathode tab, to which the cathode mixture layer is applied, in a full width direction and a full length direction. If the above numerical range is not satisfied, problems such as short circuit may occur when forming an electrode assembly through a lamination and stacking process.

A full length L6 of the shoulder portion, which is a protruding length of the shoulder portion 6, is extended relatively longer than an area of the lower portion of the cathode tab, and the full width W6 of the shoulder portion 6 is formed relatively greater than a width W31 of the lower portion of the cathode tab.

The area on which the anode mixture layer of the anode plate is applied including a lower portion 41 of an anode tab and the shoulder portion 6 is larger than the area on which the cathode mixture layer of the cathode plate is applied.

In a general notching process or lamination process, cutting or lamination is performed based on an electrode tab. However, since the electrode tab is made only of metal foil, the electrode tab is thinner than a mixture layer on which an electrode active material is applied, resulting in low process efficiency and high defect rate.

Therefore, there are provided an electrode and a method of manufacturing an electrode assembly based on a shoulder portion, the shoulder portion being solid as it is thicker than a conventional electrode tab and having no light reflection due to the application of active material, in order to change the cutting standard of the electrode in the lamination process, improve the alignment accuracy during stacking, and increase the effectiveness of ACOH (Anode Cathode Overhang) gap inspection.

Figure 5:
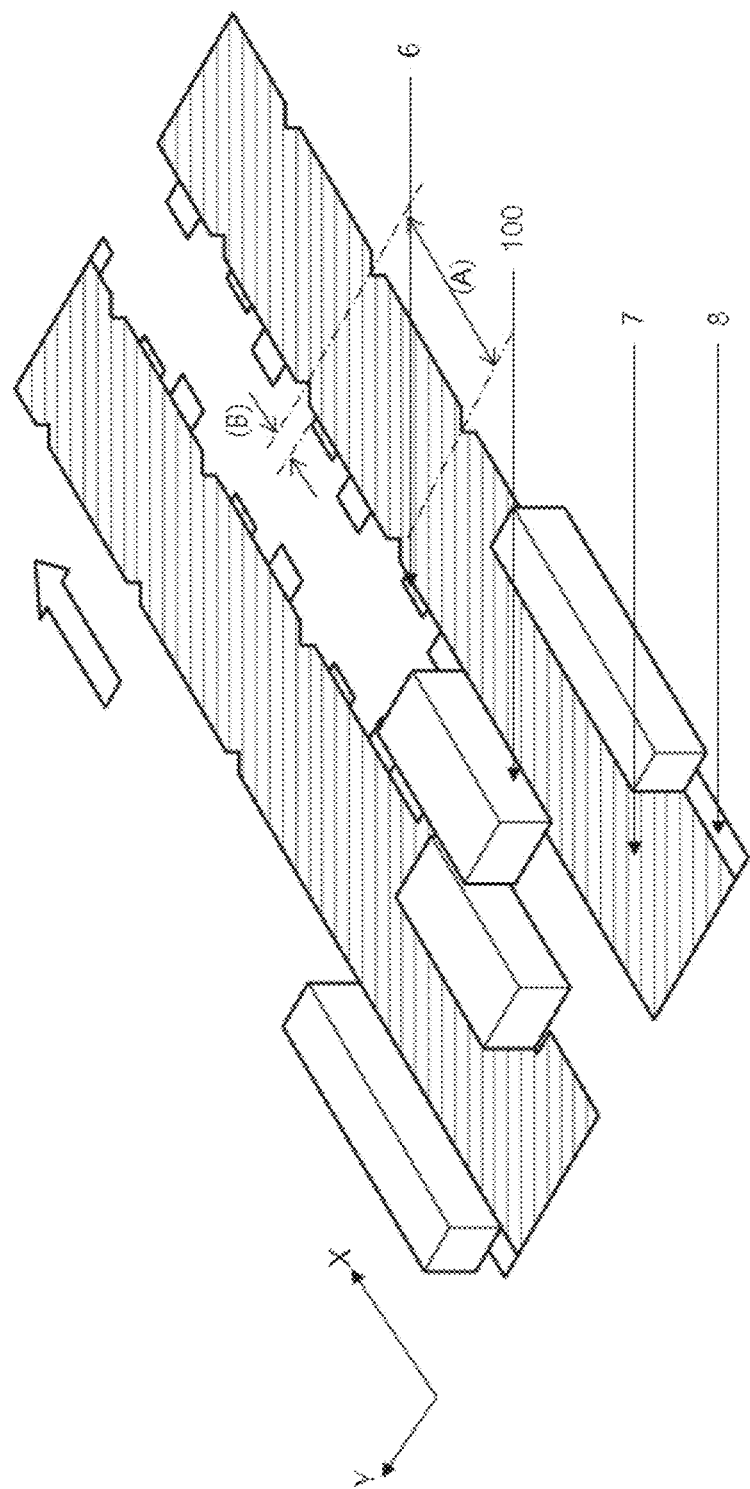
FIG. 5 is a schematic view illustrating a step of notching an anode based on a shoulder portion by a press on which a mold is formed.

FIG. 5 is a schematic view illustrating a step of notching an anode based on a shoulder portion by a press on which a mold is formed according to an embodiment.

In general, a roll press process is performed such that heated rollers are placed on upper and lower surfaces of an electrode-processed body on which an electrode slurry including an electrode active material is applied, and the heated rollers press the electrode slurry in a direction of the electrode-processed body. In the roll press process, a solvent remaining in the electrode slurry is evaporated, and the electrode slurry is compressed and cured on the electrode to form an electrode mixture layer having improved energy density. Thereafter, a process for processing an outer shape of a set electrode is performed.

In a process of slitting the electrode-processed body of the roll press process, an electrode current collector coated with the electrode mixture, made of a metal sheet which is elongated in one direction, is slit using a cutter, and the electrode current collector is divided into electrode strips. In particular, a Y-direction is a full-length direction of a metal foil, and a X-direction is a longitudinal direction of a metal foil, which is a full width.

As a method of manufacturing an anode to secure an ACOH (Anode Cathode Overhang) gap, there may be provided the method comprising a first step of manufacturing an anode roll, the anode roll having an active material-coated portion and a non-coated portion formed in a full length direction (Y-axis direction); a second step of performing notching an anode tab comprising the active material-coated portion and the non-coated portion at a predetermined interval (A) in a full width direction (X-axis direction) of the anode sheet, and a shoulder portion including only the active material-coated portion; and a third step of cutting at a predetermined interval (B) in a full width direction (X-axis direction) on the basis of the shoulder portion.

There may be an anode plate in which the anode tab is protruded from one outer peripheral end, and an anode mixture layer including an anode active material is applied on a lower portion of the anode tab and on a current collector.

The anode tab is protruded from one outer peripheral end in the full length direction (Y-axis direction) in the anode plate, and the anode mixture layer including the anode active material is applied on the lower portion of the anode tab protruding from the anode plate and on an anode current collector.

The predetermined interval A may be a full width of a single anode.

The full width of the anode may be 1 to 500 mm, preferably 10 to 200 mm. At this time, it is obvious that the predetermined interval A may vary depending on the design capacity of a battery.

The predetermined interval B may be a distance from one end of the shoulder portion to a boundary line being cut to form the single anode in the full width direction.

The predetermined interval B may be 1 to 300 mm, preferably 5 to 100 mm. At this time, it is obvious that the predetermined interval B may vary depending on the design capacity of a battery.

Figure 6:
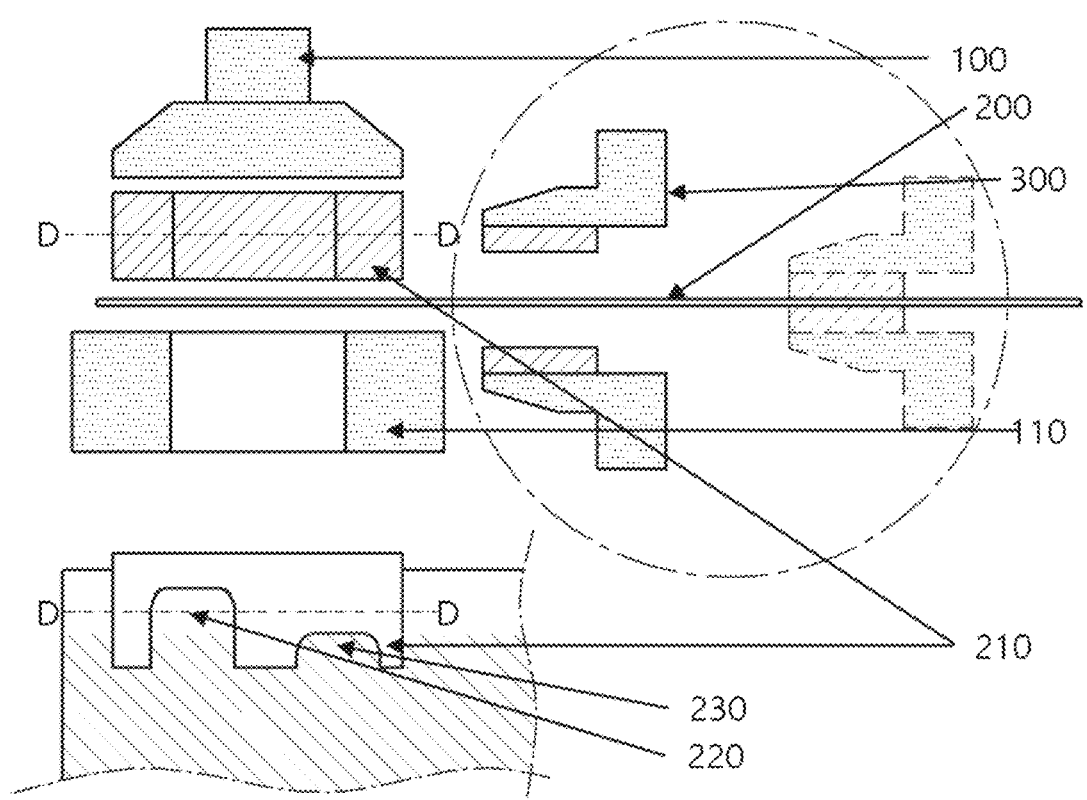
FIG. 6 is a cross-sectional view illustrating a step of notching an anode based on a shoulder portion by a press according to an embodiment.

FIG. 6 is a cross-sectional view illustrating a step of notching an anode based on a shoulder portion by a press according to an embodiment of the present invention.

Referring to FIGS. 5 and 6, electrode workpieces manufactured through a slitting process are subjected to a notching process in which the shape of an electrode tab is processed using a mold or a laser. Specifically, the electrode workpieces are cut using molds to process the shape of the electrode tab and the shape of a coated portion coated with an electrode mixture.

In addition, the shape of a shoulder portion including an anode mixture layer may be processed.

The notching process of such a continuous feeding manner is a method in which a press simultaneously transports and presses an electrode sheet, and is characterized in that the pressed electrode sheet is continuously fed without stop. Describing this continuous feeding manner, it includes a press 100 to press an anode sheet 200 in the form of a predetermined shape and a feeder 300 to feed the anode sheet to the press, and the press also serves as a feeder. That is, the press presses the anode sheet and, at the same time, transports half of a transport length, and the stand-by feeder continuously transports the anode sheet in a state that the feeder transports the remaining transport length. The anode sheet is continuously transported at a predetermined rate.

Figure 7:
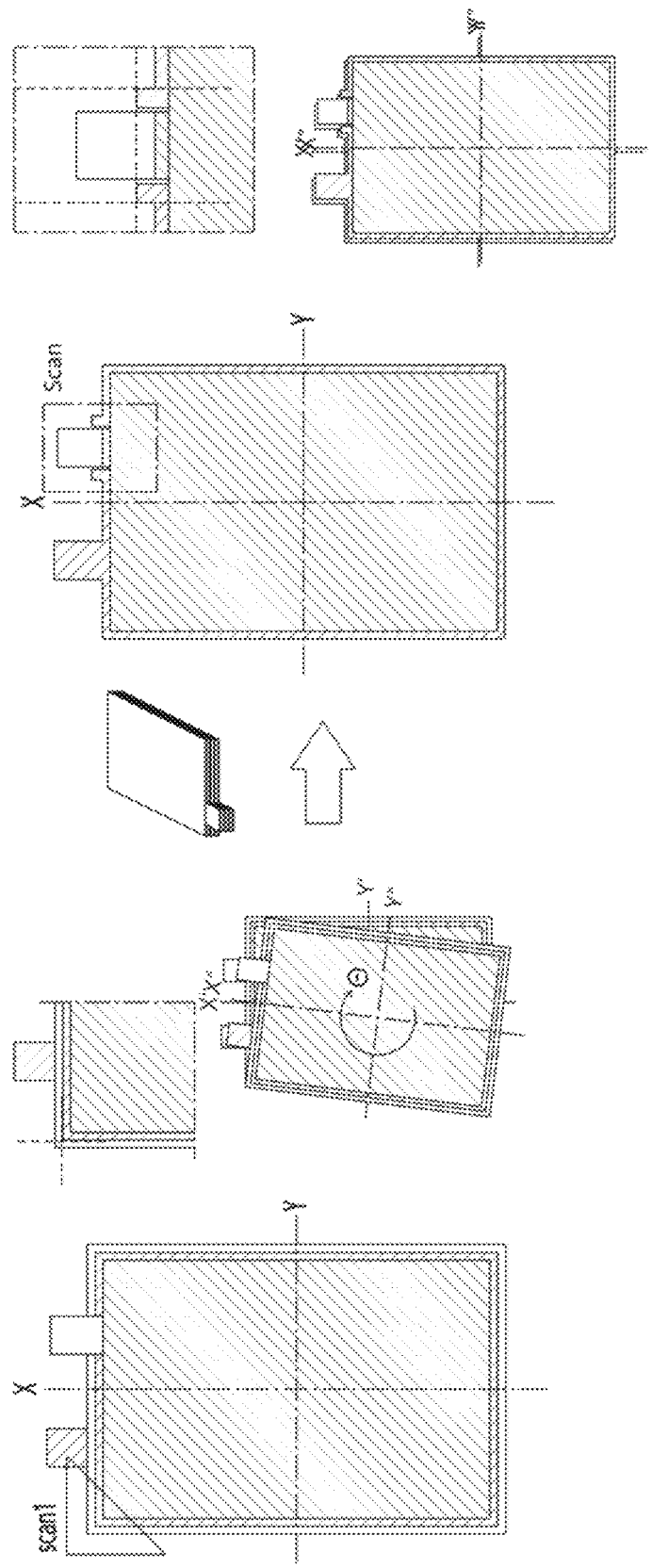
FIG. 7 is a schematic view for showing improvement in accuracy by stacking a unidirectional electrode based on a shoulder portion according to an embodiment as compared to a problem in stacking a conventional unidirectional electrode.

FIG. 7 is a schematic view showing improvement in accuracy by stacking a unidirectional electrode based on a shoulder portion according to an embodiment as compared to a problem in stacking a conventional unidirectional electrode.

In order to increase the accuracy of stacking the electrodes to form the conventional unidirectional electrode assembly on the left side of FIGS. 7, X, Y, and Θ were adjusted by scanning edges of the electrodes. However, as the stacking progresses as shown in FIG. 7, X was distorted into X' and X", Y was distorted into Y' and Y", and changes in values also occurred. X, Y, and Θ were adjusted by scanning a portion at which the shoulder portion and the cathode tab are stacked. As a result, the stacking accuracy was improved.

Figure 8:
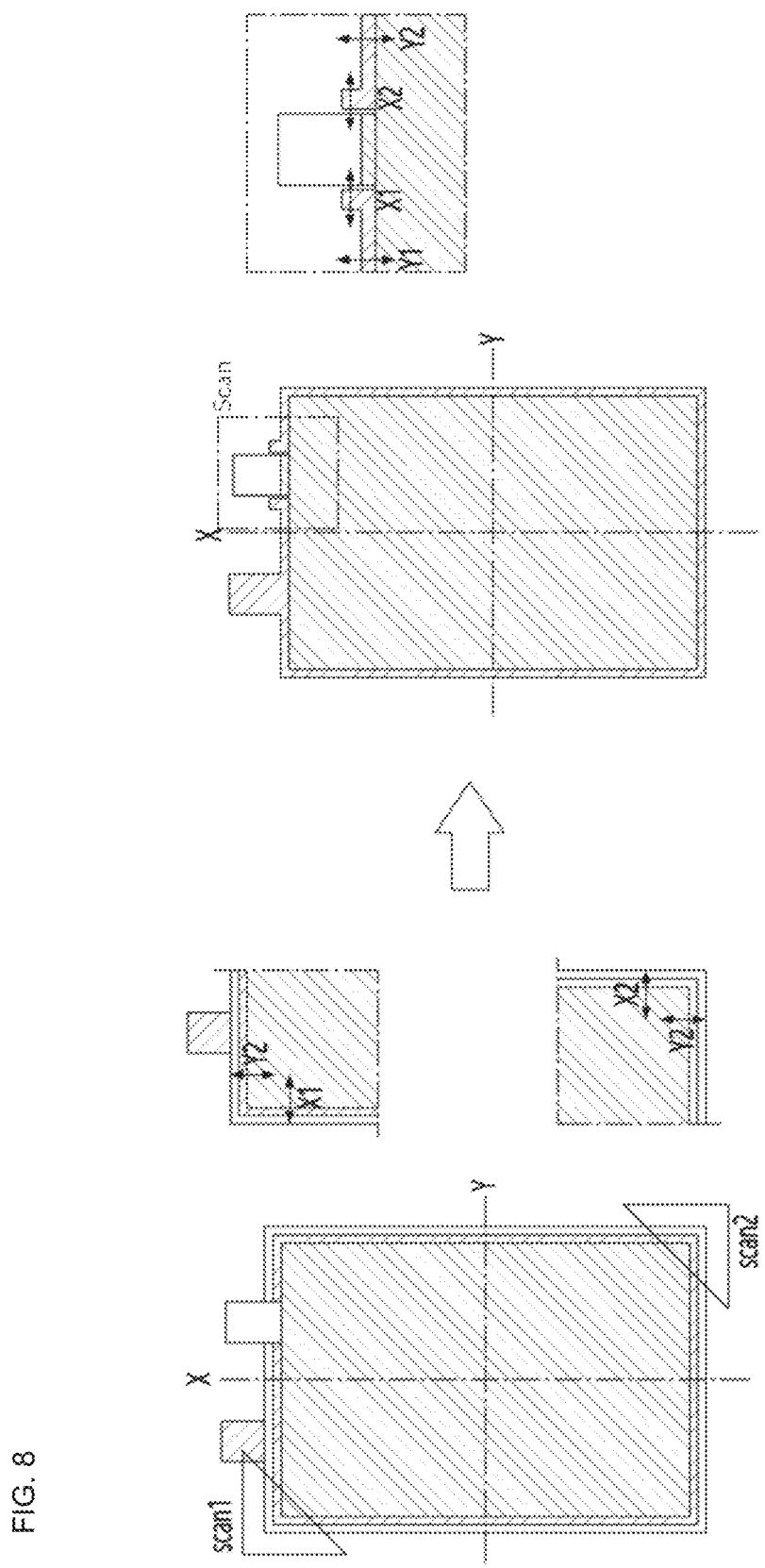
FIG. 8 is a schematic view for showing improvement in measurement accuracy of a gap between a cathode and an anode according to an embodiment as compared to stacking a conventional unidirectional electrode.
Figure 9:
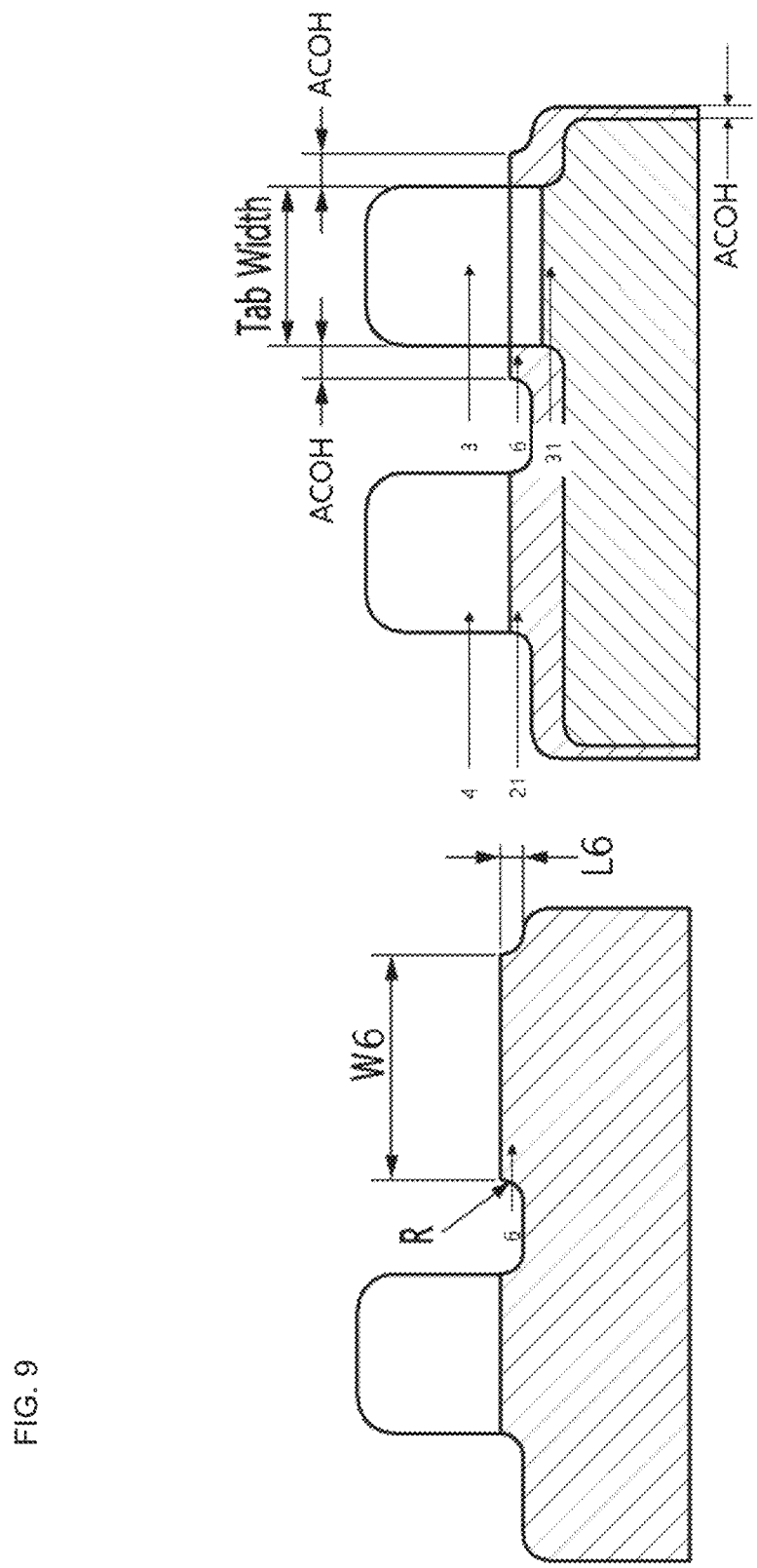
FIG. 9 is a schematic cross-sectional view of a bidirectional electrode assembly in which a shoulder portion is formed according to an embodiment.
Figure 10:
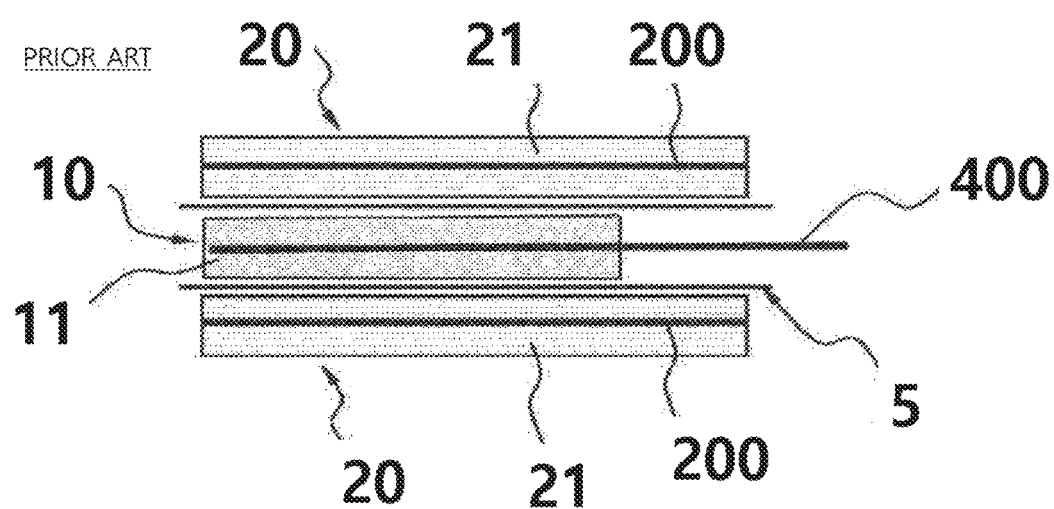
FIG. 10 is a cross-sectional view of a conventional electrode assembly.

FIG. 8 is a schematic view showing improvement in measurement accuracy of a gap between a cathode and an anode according to an embodiment as compared to a problem in stacking a conventional unidirectional electrode.

When stacking to form the conventional unidirectional electrode assembly on the left side of FIG. 8, the accuracy of the stacking process was measured by measuring a gap between the cathode and the anode. At this time, the gap between the cathode and the anode had to be measured by measuring at least two edges of the stacked electrodes.

In accordance with the present invention, it was possible to improve the accuracy of the stacking process by measuring a gap between the cathode and the anode by scanning only a portion in which a shoulder portion and a cathode tab were formed.

A centerline of the shoulder portion in a full length direction may be aligned with a centerline of a cathode tab of the cathode.

It is obvious that the alignment of the centerline of the shoulder portion in the full length direction with the centerline of the cathode tab of the cathode is a design criterion, and may correspond to a center value of the process variation in the actual mass production process. Therefore, the formation of an anode sheet formed with a shoulder portion partially out of the alignment of the centerlines can be sufficiently expected.

In a cathode plate, the cathode tab protrudes from one outer peripheral end in a full length direction (Y-axis direction), and a cathode mixture layer including a cathode active material is applied on a lower portion of the cathode tab protruded from the cathode plate and on a cathode current collector.

A height in the full length direction of the shoulder portion based on an outer peripheral end of the anode plate may be equal to or lower than a height of the active material-coated portion of the anode tab.

The height in the full length direction of the shoulder portion based on the outer peripheral end of the anode plate may be higher than a height of the active material-coated portion of the cathode tab.

A full width of the shoulder portion may include a full width of the cathode tab and ACOH gaps at both sides of the cathode tab.

If the above numerical values are not secured, mass-productivity of product and processability improvement cannot be expected. In addition, the defective rate may increase when welding electrode tabs.

A full length L6 of the shoulder portion may be 0.1 to 3 mm from one outer end of the anode to serve as a reference when stacking the electrode assembly. When the lower limit is exceeded, safety problems may occur. The full length of the shoulder portion should be greater than or equal to the lower limit in order to secure the ACOH gap and serve as a reference when stacking electrodes. If the upper limit is exceeded, a coated portion may exceed the separator and unnecessary electrode loss may occur.

An R-value of the shoulder portion may be 0.1 R to 3 R for the connection between electrodes. When the R-value of the shoulder portion is beyond this range, electrode quality may deteriorate.

There may be provided an anode being formed with an anode tab including the active-material coated portion and the non-coated portion, and a shoulder portion including only the active-material coated portion being formed at a predetermined interval A in a full width direction (X-axis direction), wherein a centerline in the full width direction of the shoulder portion is aligned with a centerline of a cathode tab, and a full width of the shoulder portion includes a full width of the cathode tab and ACOH gaps at both sides of the cathode tab.

The anode tab and the shoulder portion may be formed together at one end of the anode in a full length direction (Y-axis direction) or formed at opposite ends of the anode in the full length direction (Y-axis direction).

There may be a method of manufacturing an electrode assembly, the method comprising: vision sensing a shoulder portion of an anode; and stacking such that a cathode tab of a cathode sheet is located on the basis of a full width or a full length of the shoulder portion, wherein an ACOH gap between the stacked cathode tab and the shoulder portion is measured to prevent misalignment of stacking of an electrode assembly, the anode is formed with an anode tab including an active material-coated portion and a non-coated portion, and the shoulder portion including only the active material-coated portion at a predetermined interval (A) in a full width direction (X-axis direction), a centerline of the shoulder portion in a full length direction is aligned with a centerline of the cathode tab, and a full width of the shoulder portion includes a full width of the cathode tab and ACOH gaps at both sides of the cathode tab.

There may be a method of manufacturing an electrode assembly, the method comprising: stacking such that the cathode tab of the cathode is located on the basis of the full width or the full length of the shoulder portion; and vision sensing the shoulder portion of the anode stacked under the cathode tab of the cathode, wherein an interval between one end of the stacked cathode and one end of the stacked anode in a full length direction (Y-axis direction) and the ACOH gap between the stacked cathode tab and the shoulder portion are measured to define a gap between the cathode and the anode.

In the method of manufacturing an electrode assembly, the electrode assembly may have a stacked type, a zigzag type, a jelly-roll type, or a stacked/folded type structure.

In the method of manufacturing an electrode assembly, the electrode assembly may be comprised of a single electrode plate and unit cells comprising a bi-cell having the same polarity of electrode plates on both outer surfaces, or full cells having different polarities of electrode plates on both outer surfaces.

In the method of manufacturing an electrode assembly, the cathode tab and the anode tab may be formed in the same direction or in opposite directions on the basis of a full length direction (Y-axis direction).

There may be provided a battery cell including the electrode assembly manufactured by the method for manufacturing the electrode assembly in which the electrode assembly is embedded together with an electrolyte in a battery case.

There may be provided a battery pack including one or more of the battery cells.

There may be provided a device including the battery pack.

In addition, a section capacity of an anode inclined portion of the active material-coated portion of the shoulder portion may be higher than a section capacity of a cathode inclined portion of the active material-coated portion of the cathode tab.

In addition, an anode height ratio $H_{NTN2}/H_{NS}$ of a height $H_{NTN2}$ from the anode tab neck 214 as a starting point to the active material-coated portion of the anode tab and a height $H_{NS}$ from a starting point at which the shoulder portion is formed to the active material-coated portion is 5.0 to 1.

That is, the anode sheet including the shoulder portion may be notched by moving upward or downward in the full length direction at the input position of the anode sheet forming a notching in the conventional anode sheet. The notching condition may be performed at 0.1 to 1.5 mm above the existing condition.

Through these improvements, it is possible to improve the stability evaluation, process capability and ACOH gap of the electrode assembly.

The shoulder portion may be in contact with the cathode tab neck, and the shoulder portion may be overlapped with a coated portion, which is an active material-coated portion of the cathode, when the anode having the shoulder portion formed and the cathode are stacked.

The shoulder portion formed on the anode should be formed on the coated portion.

In addition, the shoulder portion formed on the anode should be larger than the cathode tab neck.

Accordingly, the height of the shoulder portion cannot be greater than the lower limit of the anode tab neck. The reason for this is to prevent a short circuit due to contact between foils, which are metal sheets constituting the electrode, as the contact between non-coated portions to which the active material of the cathode and the active material of the anode are not applied causes a short circuit, resulting in a high risk of fire.

Figure 11:
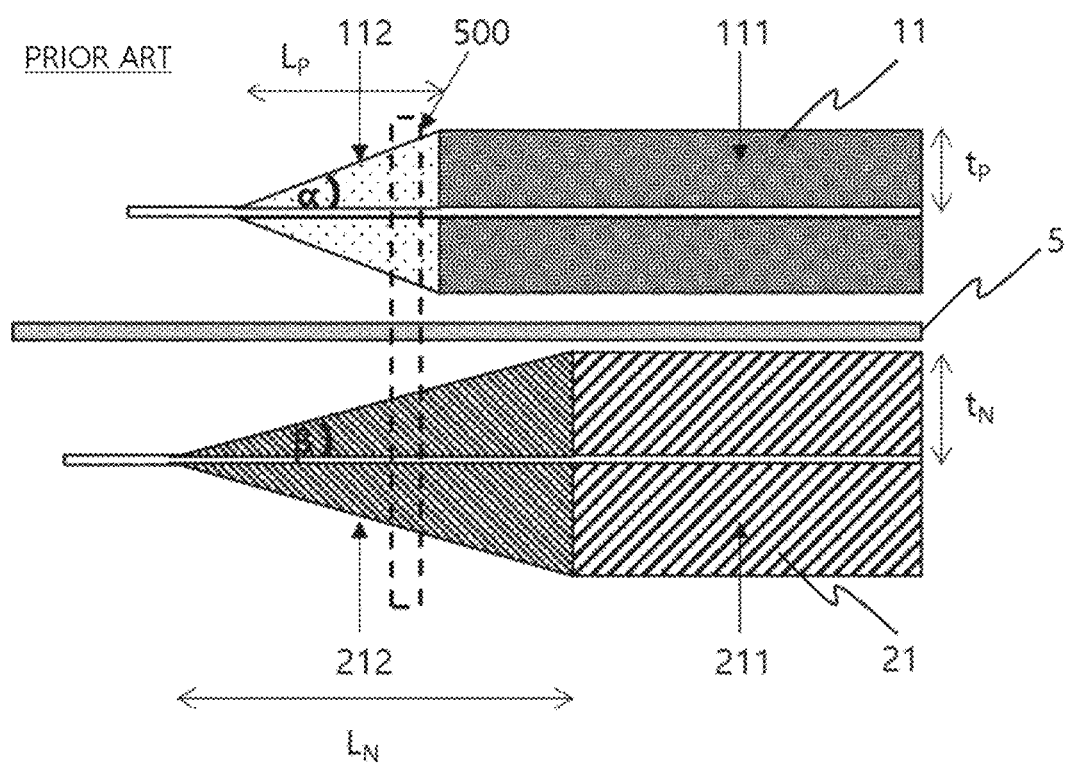
FIG. 11 is an enlarged cross-sectional view showing the existence of an anode-to-cathode capacity reversal portion of the conventional electrode assembly.
Figure 12:
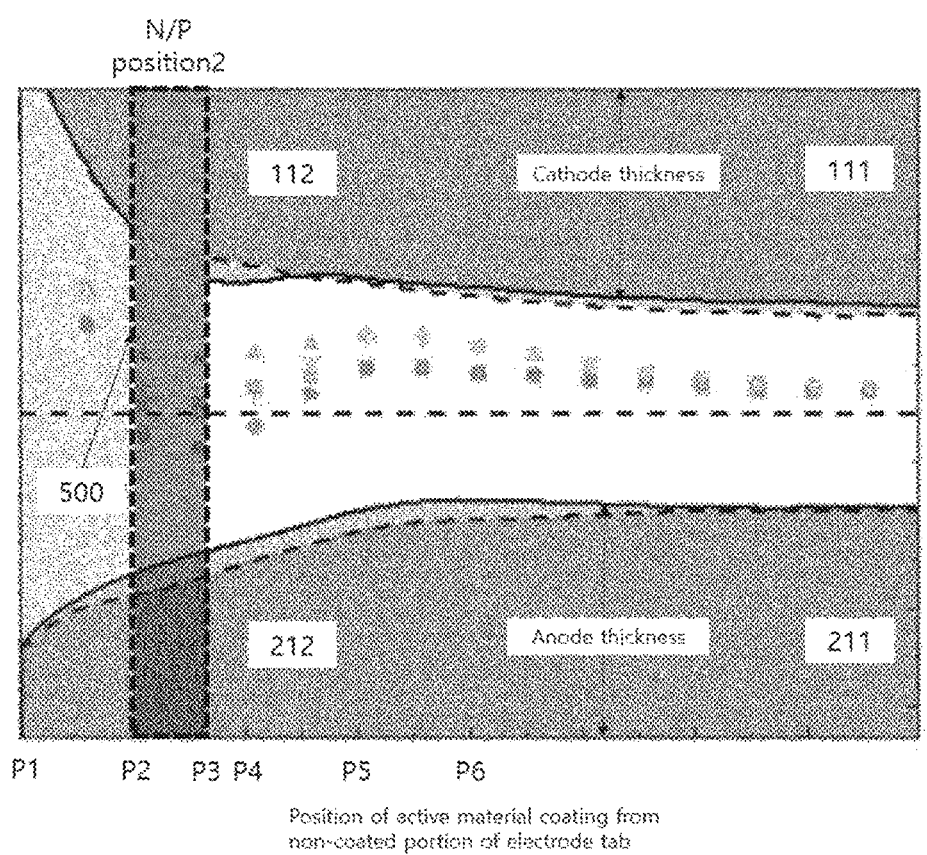
FIG. 12 is a plot showing the experimental results confirming the existence of the anode-to-cathode capacity reversal portion according to an anode-to-cathode capacity ratio of the conventional electrode assembly.
Figure 13:
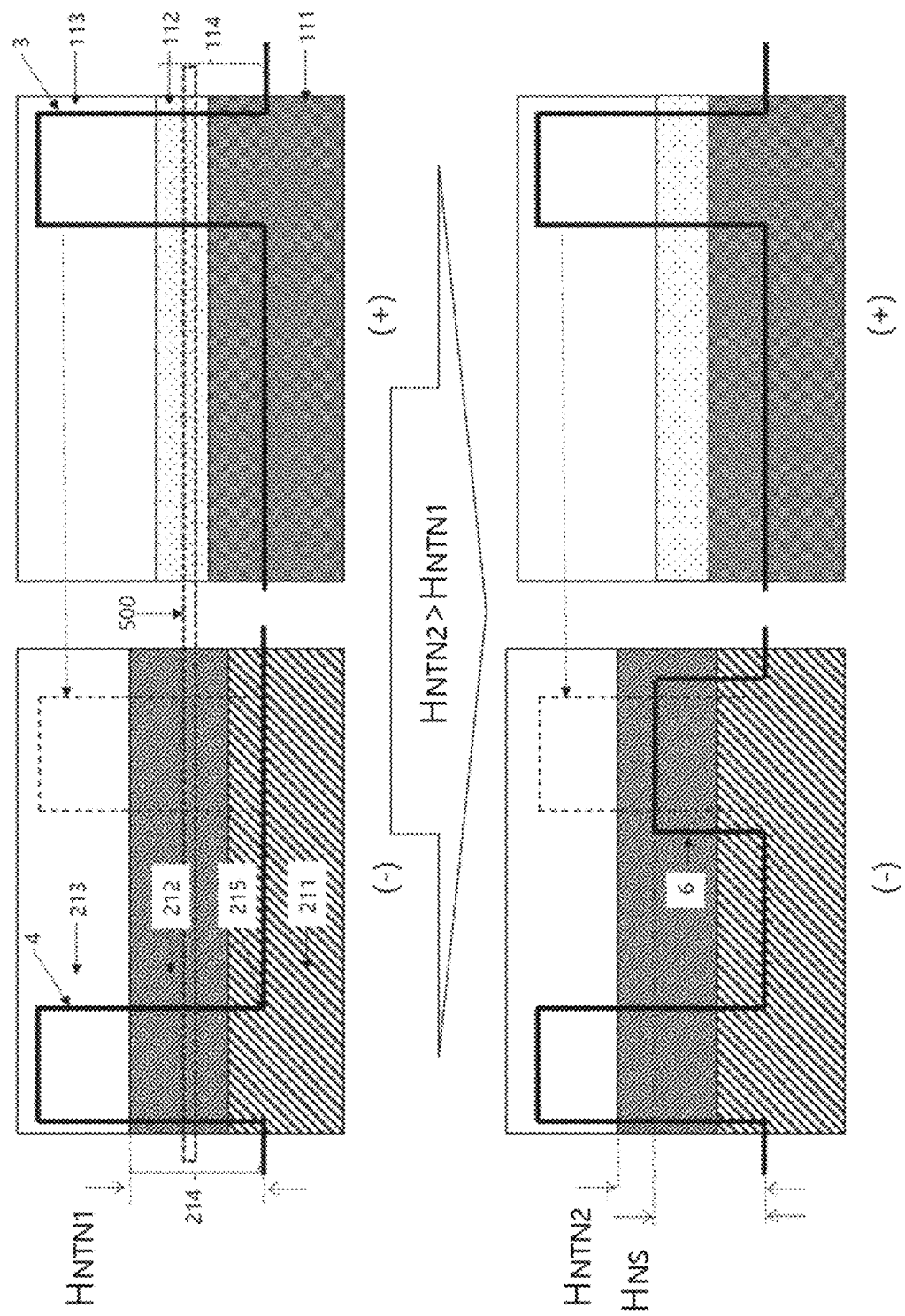
FIG. 13 is a comparison of a plan view of the conventional electrode assembly in which the anode-to-cathode capacity reversal portion is present and a plan view of an electrode assembly in which a shoulder portion from which the anode-to-cathode capacity reversal portion is removed is formed in a unidirectional electrode assembly according to an embodiment.

FIG. 13 is a plan view of FIG. 11 before and after an application of the present invention. An upper side of FIG. 13, which is before an application of the present invention, is a plan view of the anode and the cathode of FIG. 11, and it can be seen that a height $H_{NTN1}$ from the anode tab neck 214 to the active material-coated portion and an anode-to-cathode capacity reversal portion 500 exist.

In a lower side of FIG. 13, which is after an application of the present invention, it can be seen that a height $H_{NS}$ from a starting point at which a shoulder portion 6 is formed on the anode to the active material-coated portion is formed in the anode flat portion to the anode inclined portion.

The height $H_{NTN1}$ from the anode tab neck 214 before an application of the present invention to the active material-coated portion is smaller than the height $H_{NTN2}$ from the anode tab neck 214 after an application of the present invention to the active material-coated portion. Accordingly, it is possible to eliminate the formation of the anode-to-cathode capacity reversal portion.

The anode after an application of the present invention may move in the full length direction (Y-axis direction) than the anode before an application of the present invention to form a shoulder portion.

When the anode is beyond this range, the anode-to-cathode capacity reversal portion may occur, resulting in battery safety problems.

Those skilled in the art to which the present invention pertains will appreciate that various applications and modifications are possible based on the above description, without departing from the scope of the present invention.

DESCRIPTION OF REFERENCE NUMERALS

1: Cathode plate
10: Cathode
11: Cathode mixture layer
111: Cathode flat portion
112: Cathode inclined portion
113: Cathode non-coated portion
114: Cathode tab neck
2: Anode plate
20: Anode
21: Anode mixture layer
211: Anode flat portion
212: Anode inclined portion
213: Anode non-coated portion
214: Anode tab neck
3: Cathode tab
31: Lower portion of cathode tab
4: Anode tab
41: Lower portion of anode tab
5: Separator
6: Shoulder portion
100: Press
110: Lower press
200: Anode sheet
210: Mold
220: Mold part of anode tab
230: Mold part of shoulder portion
300: Sheet feeder
400: Cathode sheet
500: Anode-to-cathode capacity reversal portion As described above, the anode having improved stacking property of an electrode, the electrode assembly comprising the anode, and the method of manufacturing the same according to the present invention have the effect of reducing the occurrence of errors by changing the cutting of an electrode based on a shoulder portion of the anode in the lamination process.

In addition, when stacking to form an electrode assembly, there is an effect of reducing an error due to misalignment when stacking on the basis of the corners of the electrode.

In addition, when stacking to form an electrode assembly, there is an effect of improving the fairness and accuracy of the ACOH gap measurement by measuring the shoulder portion.

In addition, it provides an effect of increasing the capacity of the electrode assembly by efficiently applying the electrode mixture layer including the electrode active material over a larger area without increasing the volume of an electrode plate.

In addition, when forming an electrode assembly, there is an effect of preventing the occurrence of an anode-to-cathode capacity reversal portion, which is caused by a thinner electrode mixture layer including an electrode active material toward the ends of the cathode and the anode.

Therefore, it provides an effect of improving the stability, capacity and lifespan of the secondary battery.

The invention claimed is:

1. An electrode assembly, comprising:
a cathode in which a cathode tab protrudes from one outer end and a cathode mixture layer comprising a cathode active material is applied on a lower portion of the cathode tab and on a cathode current collector;
an anode in which an anode tab protrudes from one outer end and an anode mixture layer comprising an anode active material is applied on a lower portion of the anode tab and on an anode current collector; and
a separator interposed between the cathode and the anode,
wherein the anode is formed with the anode tab comprising an active material-coated portion and a non-coated portion, and a shoulder portion comprising the active material-coated portion at a predetermined interval,
wherein the shoulder portion is formed at a position facing the cathode tab when stacked with the cathode, and
wherein the shoulder portion has a protruding length extending perpendicularly away from an end of a rectangular portion of the anode, and the cathode active material extends on the cathode tab beyond the end of the rectangular portion of the anode and at least partially overlies the shoulder portion.

2. The electrode assembly according to claim 1, wherein the anode tab and the shoulder portion of the anode are formed together at one end of the anode in a full-length direction parallel to a Y-axis or formed at opposite ends of the anode in the full-length direction.

3. The anode according to claim 1, wherein the anode has no anode-to-cathode capacity reversal portion in which a section capacity of an anode inclined portion of the active material-coated portion of the shoulder portion is higher than a section capacity of a cathode inclined portion of an active material-coated portion of the cathode tab.

4. The anode according to claim 1, wherein the anode has an anode height ratio ($H_{NTN2}/H_{NS}$) of a height ($H_{NTN2}$) from an anode tab neck to an end of the active material-coated portion on the anode tab to a height ($H_{NS}$) from a shoulder portion neck to an end of the active material-coated portion on the shoulder portion within a range of 2-5, the anode tab neck being a location where the anode tab perpendicularly extends away from the end of the rectangular portion of the anode, the shoulder portion neck being a location where the shoulder portion perpendicularly extends away from the end of the rectangular portion of the anode.

* * * * *